Patented June 28, 1927.

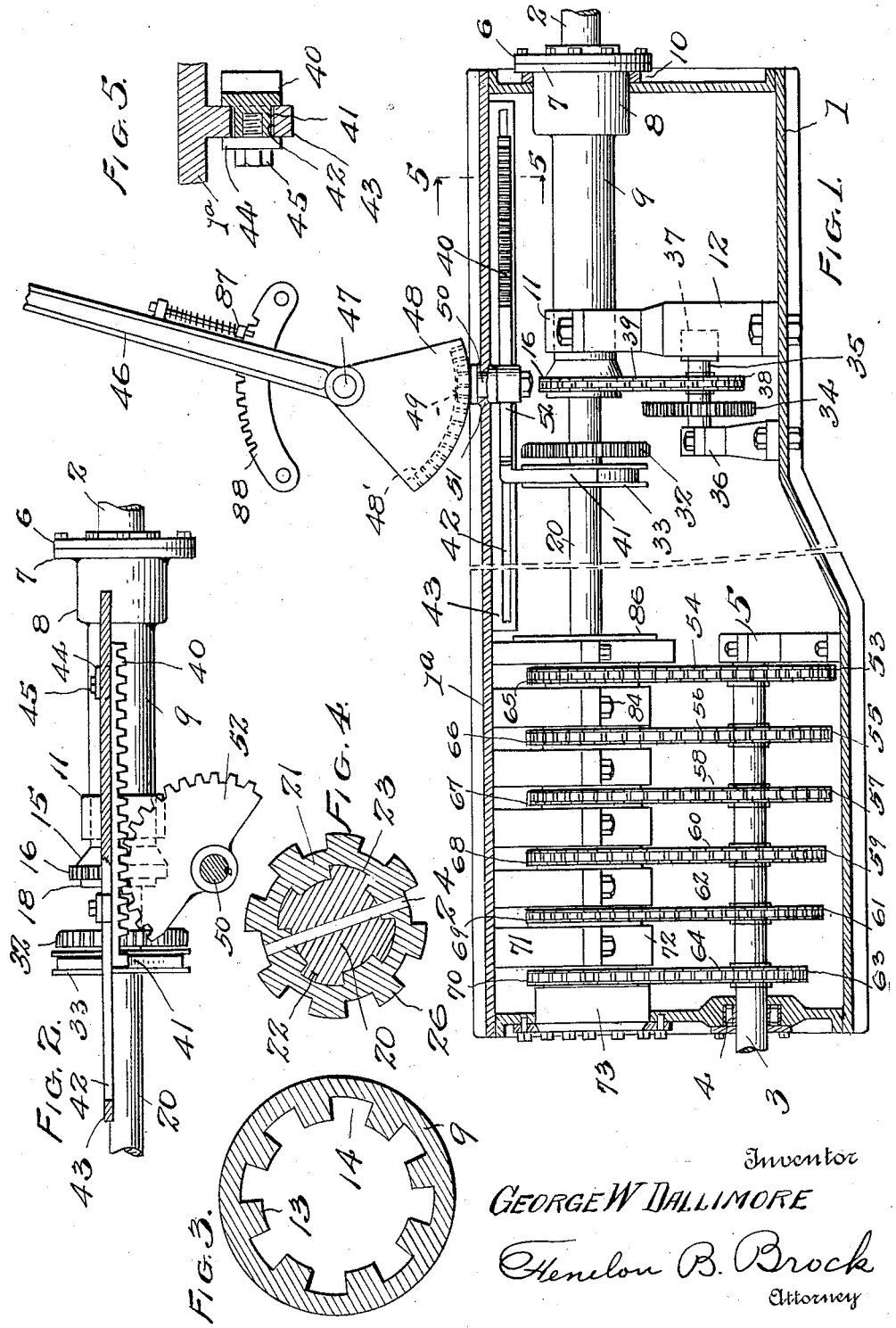

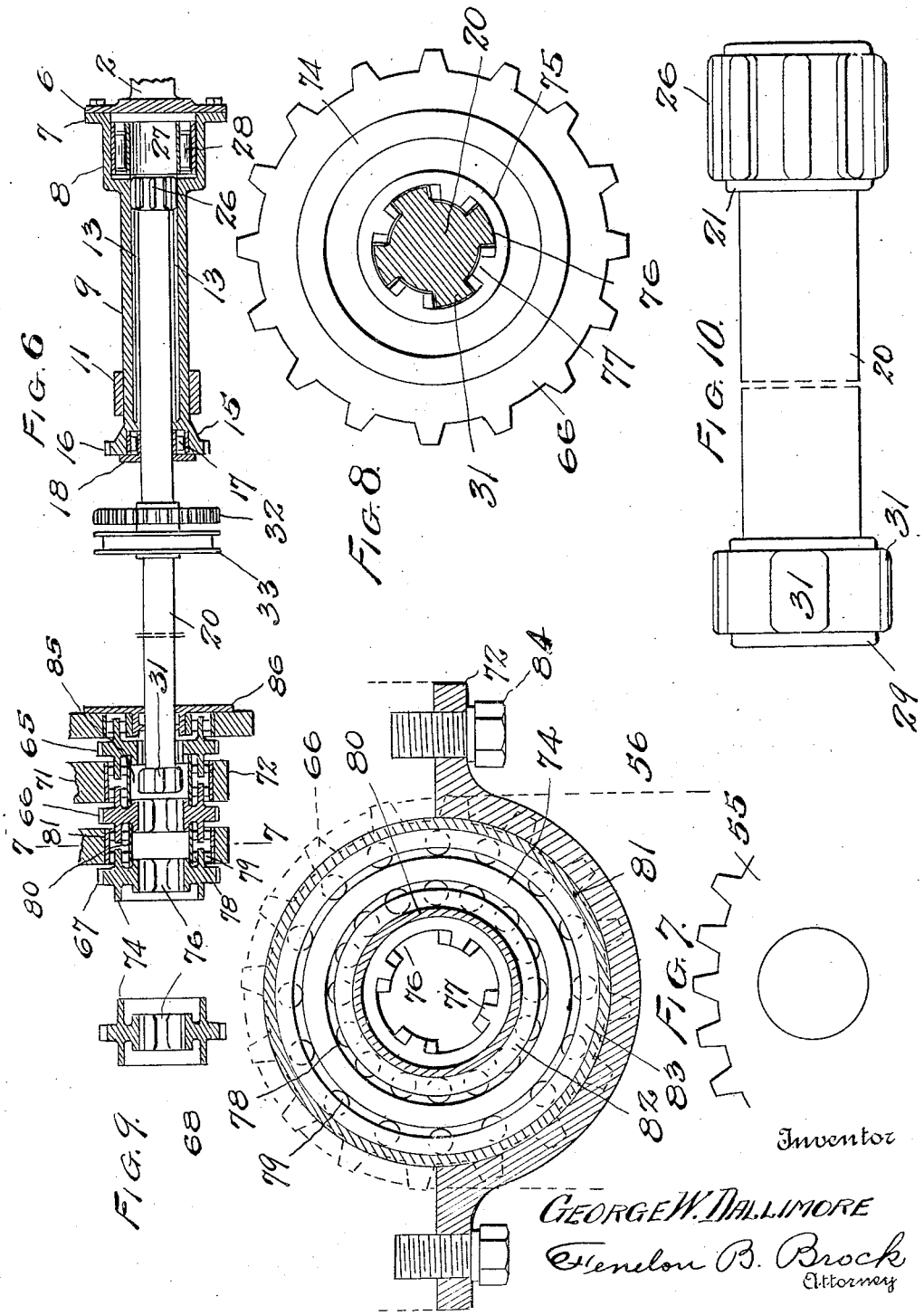

1,634,138

UNITED STATES PATENT OFFICE.

GEORGE W. DALLIMORE, OF OAKLAND, CALIFORNIA.

VARIABLE-SPEED-TRANSMISSION MECHANISM.

Application filed September 17, 1924. Serial No. 738,241.

The variable speed transmission mechanism of my invention is especially adapted for use on automotive vehicles such as trucks, automobiles and similar vehicles and also for machine tools. The invention involves mechanism of the slidekey type employing a slidable transmission shaft for connection with and disconnection from selected units of a series of co-axial loose driving gears or sprocket wheels for transmission of different speeds and reverse to complementary driven gears or sprocket wheels on a driven shaft. By the utilization of the mechanism of my invention between the driving or clutch shaft and the driven or propeller shaft of an automotive vehicle means are provided which insure a smooth and easy running of the transmission mechanism with a steady and uniform transmission of power therethrough.

Operating means are provided for selectively varying the forward speed and reverse by longitudinal shifting of the transmission shaft whereby the co-axial loose drive gears or sprocket wheels are locked in driving connection, as by a gradual step by step action. While I have illustrated five forward speeds and a reverse speed device, it will be understood that the number of speed changing or transmission devices may be varied if desired in order that the speed may be changed with facility and flexibility of action, from slow up to various higher speeds.

The invention consists in certain novel features of construction and combinations and arrangements of parts in the variable speed mechanism and operating means therefor as will hereinafter be more fully set forth and claimed.

In the accompanying drawings I have illustrated one complete example of the physical embodiment of my invention wherein the parts are combined and arranged in accordance with the best mode I have thus far devised from the practical application of the principles of my invention, but it will be understood that various changes and alterations are contemplated and may be made in the exemplified structure within the scope of my claims without departing from the spirit or principles of my invention.

Figure 1 is a longitudinal vertical sectional view of the transmission housing or box illustrating the general assembly and relation of parts of the variable speed transmission mechanism and operating means therefor.

Figure 2 is a top plan view (showing a slotted guide plate in section) of a portion of the operating mechanism.

Figure 3 is an enlarged transverse sectional view of the hollow drive shaft.

Figure 4 is a transverse sectional view through one of the key or spline heads of the transmission shaft.

Figure 5 is a sectional detail view at line 5—5 of Fig. 1.

Figure 6 is a longitudinal sectional view of some of the co-axial loose drive gears or sprocket wheels and the hollow or tubular drive shaft with the transmission shaft in first neutral position with relation to the drive gears.

Figure 7 is an enlarged transverse sectional view at line 7—7 of Figure 6 and showing also a portion of one of the driven gears.

Figure 8 is a face view of one of the loose drive gears or sprocket wheels.

Figure 9 is a sectional view of one of the loose drive members.

Figure 10 is a plan view of the transmission shaft, broken away for convenience of illustration, showing key heads at its ends.

The housing 1 in which the mechanism is enclosed is preferably formed in bolted sections with outside flanges to give ready access to its interior, and is provided with removable side plates (not shown) and a top plate 1ª. The housing is located in proper position to receive the engine or clutch shaft 2, which for purposes of illustration and description may be the driving shaft of an automotive vehicle for propelling the vehicle through the propeller shaft 3 which extends toward the left in Figure 1 to the usual universal joint, and is journaled in roller bearings 4 in an end of the housing and also in a roller bearing 5 located within the housing.

The engine or clutch shaft 2 is provided with a disk or annular flange 6 which is bolted at the exterior of the housing to a complementary flange 7 on the bearing head 8 of a tubular drive shaft 9, and the latter shaft is journaled in one end of the housing at 10 and within the housing at 11 which latter bearing is supported on the bracket 12 fixed to the bottom of the housing.

The clutch shaft 2 is thus rigidly connected with the tubular drive shaft 9 and the latter is journaled to revolve in its bearings 10 and 11 as the drive shaft of the present transmission mechanism.

Upon its inner surface the cylindrical drive shaft 9 is fashioned with alternate ribs 13 and key ways or grooves 14 (as best seen in Figure 3) which extend between the hollow head 8 at one end of the shaft and a second hollow head 15 at the opposite end of the shaft. The hollow head 15 is provided with exterior sprocket teeth 16 and an interior roller bearing 17 which is closed by the retaining plate or open disk 18 secured to the head by screws or bolts in usual manner.

Within the tubular drive shaft 9 is partly enclosed the co-axial transmission shaft 20 which is longitudinally slidable in the tubular shaft and in its bearing 17. At one of its ends the slidable transmission shaft is provided with a head 21 secured thereon by suitable means as keys 22 on the shaft and complementary keyways or grooves 23 on the head, together with a locking pin 24 (Figure 4). This head is fashioned with longitudinally extending exterior keys 26 capable of sliding in grooves or keyways 14 in the inner face of the tubular drive shaft 9. The keys 26 are at all times located in their keyways except when the reverse mechanism is being used to transmit power. Under such conditions the shaft 20 is moved to the right in Figure 6 and the key head 21 of the shaft then occupies and is journaled in a bearing sleeve 27 within the roller bearing 28 in the hollow bearing head of the drive shaft.

The inner end of the transmission shaft is also provided with a head as 29 fixed thereto as by a pin 24 in the end of the shaft, and this head is also fashioned with exterior longitudinally extending keys as 31. Preferably the ends of the keys 26 and 31 are beveled as indicated to facilitate their entrance into and withdrawal from their respective key ways, and it will be noted in Figure 10 that the respective heads are fashioned with differing numbers of keys and that the heads are of differing length. If desired the same number of keys may be used on both heads and the heads may be of duplicate construction, but preferably the keys of the head 21 are of sufficient length to occupy the bearing sleeve 27 and afford the shaft 20 a wide bearing therein when the mechanism is in reverse position to insure stable relation between the relatively movable tubular drive shaft and the transmission shaft.

The transmission shaft has rigidly secured thereon a tapered reverse gear wheel 32 and a clutch spool 33 revolving at all times therewith, the former being adapted to mesh with a complementary gear 34 on the counter shaft 35 when the mechanism is shifted to reverse position. This countershaft or reverse shaft 35 is journaled in a bearing casting 36 secured to the bottom of the housing 1 and in a roller bearing 37 (shown in dotted lines in Figure 1) in the casting 12, and said shaft has fixed thereon a sprocket wheel 38 which is coupled by chain 39 with the sprocket wheel 16 on the hollow head 15 of the drive shaft.

For reciprocating the slidable transmission shaft with relation to its tubular drive shaft 9, an operating rack or toothed bar 40 is used. This rack is located parallel with the transmission shaft and above it, and the rack is fashioned with an angularly disposed yoke 41 projecting downwardly therefrom for coaction with the flanged spool 33 on the shaft 20. The rack is adapted to slide with the shaft 20 for changing the speed of the transmission mechanism and it is suitably supported by means of a pair of laterally extending guide lugs 41 slidable in a slot 42 of a guide plate 43 cast integral with top 1ª of the housing 1. Washers 44, and bolts 45 passing through the former and into the lugs 41 retain the rack in the slot and assist in guiding its movement with relation to the slotted guide plate 43.

The actuating mechanism for reciprocating the rack and transmission shaft comprises a lever 46 located in position for access by the driver of the automotive vehicle and pivoted at 47 on a suitable support. At its lower end the lever is fashioned with a segmental plate 48 having rack teeth, as indicated by dotted lines 48', (in Figure 1) at one side of the segmental plate, which teeth mesh with a horizontally disposed pinion 49 secured on a stud shaft 50 journaled at 51 in the top plate 1ª of the housing. This stud shaft also carries at its lower end within the housing a horizontally disposed segmental rack plate 52 which meshes with the rack 40 as shown in Figure 2.

By a straight shifting movement of the lever 46 it will be apparent that the rack 40 may be shifted or reciprocated in its slotted guide plate to cause similar movement of the transmission shaft 20 through the connection between the yoke 41 and spool 33, the latter on the transmission shaft, and the transmission shaft is thus longitudinally moved with relation to the drive shaft 9. This movement may be for reversing the rotation of the propeller shaft 3 or for selectively changing the speed of its forward rotation, as power is transmitted to propel the automotive vehicle.

In the general assembly of the change speed mechanism illustrated in Figure 1 I have shown a conventional form of chain drive between shaft 20 and shaft 3, and it will be understood that I may utilize any known type of drive chains as a roller chain, a silent chain, or other suitable transmission mechanism may be employed.

Six selective speeds are indicated, one reverse and five forward and the propeller shaft is equipped with six rigid or fixed driven gears or sprocket wheels designated respectively as 53, 55, 57, 59, 61 and 63, and these several wheels are each provided with a drive chain as 54, 56, 58, 60, 62, and 64. The wheel 53 and its chain 54 form part of the reverse drive mechanism, and the wheel 55 and chain 56 form part of the first or low speed forward. Wheel 63 and chain 64 form part of the highest speed mechanism and the intermediate speeds are obtained through the remaining wheels and chains. These several chains and sprocket wheels are driven selectively from a series of loose drive gears or sprocket wheels designated respectively as 65, 66, 67, 68, 69, and 70, journaled as will be described between adjoining bearing castings 71 supported from the top plate 1ª of the housing by journal blocks 72, and by the end roller bearing 73 (Figure 1) in one of the end plates of the housing.

The ratio between the several driving wheels and their complementary driven wheels may be varied as desired to suit different purposes and conditions, as for instance the ratio for the reverse drive may be 4:1 and the first speed forward 4:1, while the remaining ratios will be varied up to 2:1 for the highest speed. Preferably the drive sprocket wheels are of the same size and the driven sprocket wheels are of various diameters to secure changes in speed of the propeller shaft 3.

The loose drive wheels are co-axially alined and mounted in the brackets or castings in roller bearings and the bearings are arranged in such manner as to support the several drive wheels in coupled pairs, but capable of independent rotation.

Each driving wheel is fashioned with a pair of laterally extending annular flanges as 74 which are of sufficient width to project within the adjoining bearing brackets 71 at each side of the wheel as best seen in Figure 6. The hub 75 of each driving sprocket wheel is fashioned with grooves or keyways 76 that alternate with longitudinal ribs 77. The grooves or keyways are complementary to the keys 31 of the head 29 on the transmission shaft 20, and it will be apparent that the shaft with its head may be slid through the successive hubs of the driving wheels for selective engagement therewith.

Two annular series of antifriction rollers 78 and 79 are located at the inner and outer sides of the pairs of flanges 74 of the driving sprockets and these rollers are interposed between said flanges and an inner bearing sleeve 80 at the inner sides of the flanges while at the outer sides of the flanges the series 79 is interposed between the flanges and an outer bearing sleeve 81. These series of rollers are retained in place by means of retaining rings 82 and 83 arranged in pairs at the opposite ends of the rollers. The inner bearing sleeves 80 surround portions of adjoining hubs of the wheels, and the outer sleeves 81 are retained in place by means of the journal bearing blocks 72 and bolts 84 which secure these blocks to castings 71.

In Figure 6 it will be observed that the inner sleeves 80 which overlap portions of adjoining hubs and support the wheels in alinement, form neutral spaces 85 between the adjoining wheels to accommodate the key-head 29 when the mechanism is in neutral position between the variable speed devices.

The inner end of the journal bearing for the several drive wheels is closed by means of a plate 86 secured by bolts or screws to the face of the first casting 71.

In Figure 1 the lever 46 has a spring latch 87 of usual type for co-action with a fixed quadrant plate 88 which is notched to receive the spring latch and retain the lever in locked position. The operating mechanism including the lever 46 is adapted to move back and forth in a straight line for either forward or reverse movements.

Lever 46 in Figure 1 is shown in locked neutral position with the transmission shaft in neutral position (Fig. 6) between reverse and low speed. By shifting the lever to the last notch at the right in Fig. 1 the transmission shaft is moved longitudinally to engage its keys 31 with reverse sprocket wheel 65 and to disengage its keys 26 from the driving shaft 9. Gear wheel 32 on shaft 20 is shifted with the transmission shaft to mesh with its complementary idler gear 34 on shaft 35. The reverse drive is now from the tubular drive shaft 9 through chain connection 39 to the idler shaft 35, gears 34 and 32 and back to the transmission shaft 20, thence through the reverse chain drive 54 to the propeller shaft 3.

As all the driven gears or sprocket wheels are keyed or fixed on the propeller shaft the speed changing devices will operate idly while the mechanism is being driven in reverse direction. So also with the forward drives when the automotive vehicle is running all of the chain drives will run idly except the chain drive locked with the keys of shaft 20. Because of this action of the chain drives there is but the relative ratio of speed at the shaft 20 between speeds to overcome in shifting the shaft 20 back and forth while the car is in motion at a selected speed. By momentarily holding the transmission shaft in a neutral position to permit speeding up or retarding of its motion, as required, to closely approximate the speed of a selected drive sprocket wheel, the shift of the shaft can be accomplished without any or only a slight difference in speed to overcome.

With the engine running, the clutch shaft 2 and transmission shaft idle and with the transmission shaft in neutral position between drive wheels, by first releasing the spring latch 87 the lever 46 may be shifted to slide the transmission shaft back and forth with relation to the drive shaft 9 to a selected speed. With the transmission shaft in the first neutral position as in Figure 6 and the engine running, the drive shaft 9 turns clockwise and with it the transmission shaft 20 and idler shaft 35 and connections.

Having thus fully described my invention what I claim as new and desire to secure by Letters Patent is—

1. In a variable speed transmission the combination with a series of loosely journaled spaced driving gears having co-axial hubs and locking members therein, of a slidable transmission shaft having complementary locking members thereon, an annular flange on each adjoining gear, and a bearing sleeve overlapping adjoining hubs, an outer bearing sleeve and a support therefor, and anti-friction devices between said flanges and said sleeves.

2. In a variable speed transmission mechanism the combination with a series of loosely journaled spaced driving gears having co-axial hubs and keyways therein, of a slidable transmission shaft having complementary keys, bearing sleeves overlapping adjoining hubs to form neutral spaces, outer bearing sleeves and supports therefor, lateral annular flanges on each gear between said sleeves, and antifriction devices between said flanges and said sleeves.

3. The combination with a tubular drive shaft having interior keyways and bearings for said shaft, of a slidable transmission shaft having complementary keys, a constant journal bearing within said drive shaft, and a journal bearing within said drive shaft beyond the keyways adapted to receive said keys.

4. The combination with a tubular drive shaft having interior keyways and bearings for said shaft, of a slidable transmission shaft having complementary keys and a fixed gear thereon, a sprocket head on said drive shaft having a constant journal bearing for said slide shaft, a journal bearing within said drive shaft beyond the keyways to receive said keys, a reverse shaft and a gear thereon, a sprocket wheel on the reverse shaft and a chain connecting said wheel with said sprocket head, and means for shifting said transmission shaft.

GEORGE W. DALLIMORE.